Oct. 18, 1938. L. DINESEN 2,133,436
FIRE HOSE NOZZLE
Filed Nov. 27, 1936
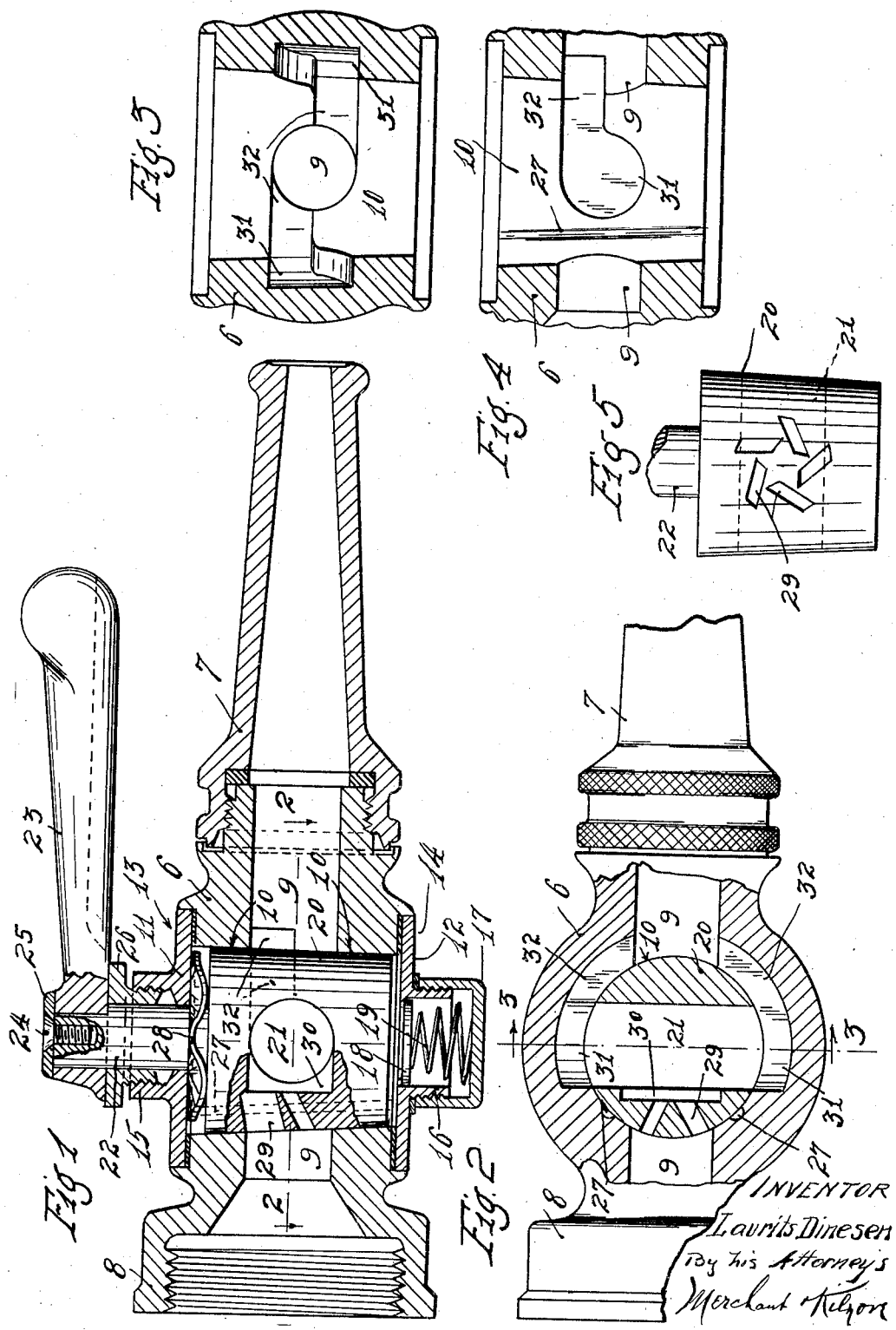
INVENTOR
Laurits Dinesen
By his Attorneys
Merchant Kilyon Patented Oct. 18, 1938

2,133,436

UNITED STATES PATENT OFFICE 2,133,436

FIRE HOSE NOZZLE

Laurits Dinesen, Minneapolis, Minn.

Application November 27, 1936, Serial No. 112,926

2 Claims. (Cl. 299—138)

My present invention provides an improved valve-equipped nozzle adapted at will for the projection and production of either a solid or unbroken stream of water, or of a finely divided water spray or mist. A nozzle of this character, while capable of general use, has been especially designed and found particularly adapted for use on fire hose, where, under certain conditions, the solid or unbroken stream is desired and where, in other cases, a spray or mist is required.

The purpose of the solid stream is, of course, well known. For extinguishing certain kinds of fire such as gasoline or oil burning on water or the like, it has been the common practice to use a chemical spray. This improved nozzle, when adjusted for the projection of a water spray or mist and without the use of chemicals in the water, has been found to be of the very highest efficiency in extinguishing, for example, gasoline burning on the surface of a tank of water. This latter noted fire-extinguishing action is due to the nature of the water spray or mist which, in practice, has been found to act like a blanket. It will completely suffocate and put out the burning oil flame or similar flame.

A commercial form of the improved nozzle is illustrated in the accompanying drawing, wherein like characters indicate like parts throughout the several views.

Referring to the drawing:

Fig. 1 is an axial section, showing the improved valve-equipped nozzle with some parts of the valve thereof broken away and sectioned on the line 1—1 of Fig. 5;

Fig. 2 is a section taken on the line 2—2 of Fig. 1 with some parts broken away;

Fig. 3 is a section taken on the line 3—3 of Fig. 2, the valve being removed from the nozzle;

Fig. 4 is a fragmentary section taken on the line 4—4 of Fig. 2, the valve being removed from the nozzle; and Fig. 5 is an elevation of the valve with some portions of its stem being broken away.

The nozzle proper or the body thereof is indicated by the numeral 6 and, as shown, is provided with the ordinary detachable nozzle tip 7 and an internally threaded socket 8 for the application of a nozzle to the end of a hose. The nozzle 6 is provided with a large axial bore or discharge passage 9, and with a large valve seat 10 that transverses and intersects the bore 9 and is preferably slightly tapered. The valve seat 10 extends completely through the nozzle, but its outer ends are, as shown, normally closed by detachable head plates 11 and 12 secured to the nozzle with water-tight joints, as shown, by means of screws 13 and 14 respectively. The head plate 11, as shown, is provided with an internally threaded sleeve 15 that affords a stuffing box; and the head plate 12, as shown, is provided with an externally threaded sleeve 16 onto which is screwed a cap 17 that serves as a grease cup. Working within the sleeve 16 is a follower 18 that is inwardly pressed by a coil spring 19 which, as shown, reacts against the cap or grease cup 17. This spring-pressed follower, in many instances, will be dispensed with.

Seated within the valve seat 10 is a rotary or oscillatory valve 20 that is tapered to fit said valve seat. This valve 20 is provided with a large diametrical passage or port 21 which, when the valve is properly turned, will register with the bore or axial passage 9. At its large end the valve 20 is provided with a short axial projecting stem 22 that projects through the sleeve 15 and is provided with an operating handle 23, which, as shown is detachably secured thereto by a screw 24 and a washer 25. Working on the stem 22 between the handle and the sleeve 15 and having threaded engagement with the latter is a gland 26 adapted to clamp a packing material within the stuffing box.

In its seated position the small end of the valve 20 is spaced somewhat from the head plate 12 so as to leave a shallow oil chamber for the reception of oil from the cap or grease cup 17, under the action of the follower 18, or an action produced by screwing the cap onto the sleeve 16. For conducting lubricating material from this shallow chamber, the valve seat 10, as shown, is formed with longitudinal grooves or oil ducts 27. For lightly holding the tapered valve in the seat a spring washer 28, as shown, is placed around the stem 22 and compressed between the head plate 11 and the large end of the valve.

On one side of its transverse main passage 21, the valve is solid, but at the opposite side said valve is provided with one or more, preferably a plurality, of relatively small water passages or ports 29 that are obliquely disposed so that when the valve is adjusted, as shown in Figs. 1 and 2, the water delivered therethrough into the passage 21 will be given a whirling motion. Preferably, the inner extremities of the ports 29 lead to a shallow recess 30 formed in one side of the passage 21.

At diametrically opposite points the valve seat 10 is formed with recesses 31, with which the opposite extremities of the passage 21 will register when the valve is adjusted, as shown in Figs. 1 and 2. These recesses 31 are provided with extended passages or ports 32 that open into the bore 9 on the delivery side of the valve. One of the passages 31—32 would function to a considerable extent before the spray-producing action is greatly increased by the two oppositely disposed ports, both of which lead to the bore 9 on the delivery side of the valve.

For the spray or vapor-producing action, the valve will be adjusted, as shown in Figs. 1 and 2. Under this adjustment the water, under a high pressure passing through the oblique ports 29, will be given a whirling motion and discharged into the valve passage 21 in a much-broken-up and more or less finely divided spray. This spray-producing action is further caused by the movements of the broken or partly sprayed water through the ports 31—32, and from which the two sprays, meeting in the bore 9 at the discharge side of the valve, will be brought together; and further spray or mist-producing action will take place. For the best results the conducting capacity of the valve port 21 and the conjoint conducting capacity of the ports 31—32 should be materially greater than the total conducting capacity of the oblique ports 29, so that there will be ample chance for expansion of the finely-broken-up water spray before it reaches the discharge portion of the bore 9. For the same reason, it will be understood that the conducting capacity of the bore 9, which is preferably the same as that of the passage 21, should be materially greater than the total conducting capacity of the oblique ports 29.

Obviously, when the valve is rotated 180° from the position shown in Figs. 1 and 2, discharge of water through the nozzle will be entirely cut off; and that when the valve is turned 90° in either direction from the position shown in Figs. 1 and 2, the nozzle will be open for the full discharge of a solid or unbroken stream.

From the foregoing it will be evident that the nozzle described is capable of various modifications, all within the scope of the invention herein disclosed and claimed.

In the applicant's nozzle, the valve is provided with a diametrical passage, and at one side thereof with a solid port and at the opposite side thereof with an auxiliary intake port through which latter water enters the auxiliary port and from thence is directed in at least one and preferably two streams on the delivery side of the valve. For producing a spray, the water is first broken up and enters through the auxiliary port of the valve from the diametrical port of the valve and from thence it is further broken up into a spray as it is delivered through the ports in the valve seat that extends to the delivery side of the valve. This in operation, insures the very finest spray such as required for extinguishing fires and especially for smothering out oil flames.

For the production of a solid or unbroken stream of water, it is important not only that the bore of the nozzle and the transverse port of the valve be round in cross section, but that they be of the same or substantially the same diameter, and hence, free from obstructions that would tend to break up the stream. These features are found in the applicant's improved nozzle.

What I claim is:

1. In a device of the kind described, a nozzle having an axial bore and a transversely intersecting valve seat, and an oscillatory valve in said seat, said valve seat having an auxiliary port leading from an intermediate portion of one side thereof to said bore on the delivery side of said valve, said valve having a transverse port adapted in one position to register with said bore and in another position to register with said auxiliary port, the diameter of the transverse port of said valve being the same as the diameter of said bore adjacent the opposite sides of said valve, said valve on one side of its transverse port being closed and at the opposite side thereof having at least one auxiliary port adapted to register with said bore on the receiving side of said valve and arranged so that the discharge therefrom will set up a whirl in said bore, when said valve is set with its transverse port registering with said auxiliary port.

2. In a device of the kind described, a nozzle having an axial bore and a transversely intersecting valve seat, and an oscillatory valve in said seat, said valve seat having segmental auxiliary ports leading from intermediate portions of the opposite side thereof to said bore on the delivery side of said valve, said valve having a transverse port adapted in one position to register with said bore and in another position to register with said auxiliary ports, the diameter of the transverse port of said valve being the same as the diameter of said bore adjacent the opposite sides of said valve, said valve on one side of its transverse port being closed and at the opposite side thereof having at least one auxiliary port adapted to register with said bore on the receiving side of said valve and arranged so that the discharge therefrom will set up a whirl in said bore, when said valve is set with its transverse port registering with said auxiliary port.

LAURITS DINESEN.